US006678441B1

(12) United States Patent
Taylor

(10) Patent No.: US 6,678,441 B1
(45) Date of Patent: Jan. 13, 2004

(54) MULTIREFLECTOR FIBER OPTIC FILTER APPARATUS AND METHOD

(76) Inventor: Henry F. Taylor, Mail Stop 3369, College Station, TX (US) 77843

(*) Notice: Subject to any disclaimer, the term of this patent is extended or adjusted under 35 U.S.C. 154(b) by 104 days.

(21) Appl. No.: 10/041,854

(22) Filed: Jan. 7, 2002

Related U.S. Application Data
(60) Provisional application No. 60/259,894, filed on Jan. 5, 2001.

(51) Int. Cl.[7] ............................. G02B 6/28; G02B 27/28
(52) U.S. Cl. ........................... 385/24; 385/27; 385/37; 385/14; 359/498; 359/337; 372/32; 372/99; 372/102; 398/121; 356/519
(58) Field of Search .......................... 372/99, 102, 22, 372/32, 28, 109; 385/14, 42, 27, 37, 24, 111, 147; 359/494, 497, 498, 337; 398/115, 118, 121; 356/345, 357, 359, 519

(56) References Cited

U.S. PATENT DOCUMENTS 5,880,874 A * 3/1999 Shibuya et al. ............. 359/337
6,445,838 B1 * 9/2002 Caracci et al. ................ 385/14
6,529,326 B2 * 3/2003 Cai ............................. 359/498

OTHER PUBLICATIONS van de Stadt, Herman and Muller, Johan M., "Multimirror Fabry–Perot Interferometers," J. Optical Society of America A, vol. 2, No. 8, pp. 1363–1370, 1985.

Stone, J., Stulz, W. and Saleh, A.A.M., "Three–mirror fibre Fabry–Perot filters of optimal design," Electronics Letters, vol. 26, No. 14, pp. 1073–1074, 1990.

Lee, Chung E., Gibler, William N., Atkins, Robert A. and Taylor, Henry F., "In–Line Fiber Fabry–Perot Interferometer with High–Reflectiance Internal Mirrors," J. of Lightwave Technology, vol. 10, pp. 1376–1379, 1992.

Town, G.E., Sugden, K., Williams, J.A.R., Bennion, I., and Poole, S.B., "Wide–Band Fabry–Perot–Like Filters in Optical Fiber," IEEE Photonics Technology Letters, Vol 7, No. 1, 1995.

Li, S., Chan, K.T., Meng, J., and Zhou, W., "Adjustable multi–channel fibre bandpass filters based on uniform fibre Bragg gratings," Elctronics Letters, vol. 34, No. 15, pp. 1517–1519, 1998.

(List continued on next page.)

Primary Examiner—Phan T. H. Palmer
(74) Attorney, Agent, or Firm—J. Nevin Shaffer, Jr.

(57) ABSTRACT

A multireflector fiber optic filter apparatus, wherein the transmittance and reflectance spectra are periodic in frequency, the apparatus comprising an etalon with N equally spaced reflectors wherein the transmittance and reflectance spectra of said etalon are periodic in optical frequency with a period given by the formula: $\Delta \nu FSR = c/(2 n_g L)$, where c=the free space speed of light; $n_g$=the group refractive index for the light propagating in the medium between the reflectors, L=separation between said reflectors, and N is an integer=3,4,5, . . . In a further aspect, an optical circulator is connected to the etalon and an optical fiber is connected to the optical circulator for reflected output.

20 Claims, 4 Drawing Sheets

OTHER PUBLICATIONS

Feng, H., Tavlykaev, R.F., and Ramaswamy, R.V., "Record= high reflectance in narrowband low–loss Bragg reflectors with Si–on LiNbO3 waveguides," Electronics Letters, vol. 35, No. 19, pp. 1636–1637, 1999.

Shaw, N., Stewart, W.J., Heaton, J. and Wright, D.R., "Optical slow wave resonant modulation in electrooptic GaAs/AlGaAs modulators," Electronics Letters, vol. 35, No. 18, pp. 1557–1558, 1999.

Taylor, Henry F., "Design of Multireflector Resonant Bandpass Filters for Guided Wave Optics," Journal of Lightwave Technology, vol. 19, No. 6, 2001.

Hsu, Kevin, Miller, Calvin M. and Bao, Yufei, "Fiber Fabry–Perot interferometers with very low polarization sensitivity," Applied Optics, vol. 33, No. 28, 1994.

Stone, L. and Stulz, L.W., "High–performance fibre Fabry–Perot filters," Electronics Letters, Vol 27, No. 24, 1991.

Taylor, Henry F., "Enhanced Electrooptic Modulation Efficiency Utilizing Slow–Wave Optical Propagation," Journal of Lightwave Technology, vol. 17, No. 10, 1999.

Henry, F. Taylor, Journal of Lightwave Technology, vol. 19, No. 6, pp. 866–871, Jun. 2000.

* cited by examiner

MULTIREFLECTOR FIBER OPTIC FILTER APPARATUS AND METHOD

CROSS REFERENCE TO RELATED PROVISIONAL PATENT APPLICATION

This non-provisional patent application is related to provisional patent application No. 60/259,894 filed on Jan. 5, 2001. Applicant hereby claims the benefit of the related provisional application and the entire provisional application is incorporated herein by reference.

FIELD OF THE INVENTION

This invention relates to a multireflector fiberoptic filter apparatus and method. In particular, the invention relates to a multireflector fiberoptic filter apparatus and method, wherein the transmittance and reflectance spectra are periodic in frequency, including an etalon with N equally spaced lossless reflectors with a specified period spacing between them.

BACKGROUND OF THE INVENTION

The Fabry-Perot interferometer (FPI), sometimes called the Fabry-Perot etalon, consists of two mirrors separated by a distance L. Since its invention about 100 years ago, the bulk-optics version of the FPI has been widely used for high-resolution spectroscopy. In the early 1980's, fiber optic FPIs consisting of mirrored fiber ends separated by an air gap were introduced as a filter technology for optical communications.

The simple, compact fiber FPI filters have proven very useful in lightwave communications, but suffer from a fundamental drawback: the gradual (6 dB/octave) dropoff of transmittance with optical frequency away from the transmittance peak. A filter with a flatter in-band response and greater out-of-band rejection would make it possible to increase the channel density and decrease the filter-related power penalty in dense wavelength division multiplexing (WDM) systems.

WDM is widely used in fiber optic communication to increase the data capacity of an optical fiber. Currently, 16, 32, or more data channels are transmitted in parallel on a single mode fiber using different optical carrier frequencies for each channel. To combine and separate these channels, a variety of frequency-selective components have been developed, including multilayer dielectric coatings, fiber Bragg gratings, arrayed waveguide gratings, and Mach-Zehnder chains. None of these techniques satisfies industry requirements for low cost, high-speed tunability, low optical insertion loss, and small size.

Thus, there is a need in the art for providing an apparatus and method for a fiber optic filter that is inexpensive to produce and that has high-speed tunablity, low optical insertion loss and is small in size.

SUMMARY OF THE INVENTION

Accordingly, the multireflector fiberoptic filter apparatus and method of the present invention includes an etalon with N equally spaced reflectors, wherein the transmittance and reflectance spectra of said etalon are periodic in optical frequency with a period given by the formula: $(\Delta v)FSR=c/(2ngL)$, where c=the free space speed of light; ng=the group refractive index for the light propagating in the medium between the reflectors; L=the separation between reflectors; and N is an integer=3,4,5, . . . .

In other aspects of the invention, the etalon is comprised of a serial arrangement of single mode optical fibers of a common length L, each with a reflector deposited on one end. In other aspects of the invention, the single mode optical fibers are aligned in tubes or in V-grooves formed on a silicon substrate, and are interfaced to one another end-to-end by means of one from a group including optical cement, epoxy, fusion splicing, or refractive-index-matching liquid.

In another aspect of the invention, the reflectors are multilayer quarterwave stacks comprising alternating layers of high and low index dielectric materials. In another aspect of the invention, the dielectric materials are chosen from a group including $TiO_2$ and $SiO_2$.

In yet another aspect of the invention, the reflectors are mirrors. In a further aspect of the invention, an optical circulator is connected to the etalon and an optical fiber is connected to the optical circulator for reflected output. In another aspect of the invention, a plurality of etalons are connected in series. In another aspect of the invention, a strain inducing device is attached to the etalon. In a further aspect of the invention, the strain inducing device is a piezoelectric element attached along the length of the etalon. In another aspect of the invention, delay sections are added between etalons.

In another embodiment of the invention, a fiber optic system contains a first input fiber, a second transmitted output fiber and a third reflected output fiber, connected to a multireflector etalon for separating equally spaced frequency channels into two groups—one transmitted and the other reflected. In said system, the transmittance and reflectance spectra of said etalon are periodic in optical frequency with a period given by the formula: $(\Delta v)FSR=c/(2ngL)$, where c=the free space speed of light; ng=the group refractive index for the light propagating in the optical fiber medium between the reflectors; and L=the separation between reflectors. Said etalon is comprised of the serial arrangement of single mode fibers of a common length L separated by N reflectors, N=3,4,5, . . . , and is connected to the second transmitted output fiber. The transmittance and reflectance spectra of said etalon are periodic in optical frequency with a period given by the formula: $(\Delta v)FSR=c/(2ngL)$, where c=the free space speed of light; ng=the group refractive index for the light propagating in the medium between the reflectors. An optical circulator is connected to the first input fiber, the etalon, and the third reflected output fiber.

In another aspect of the invention, a plurality of etalons is provided in series. In a further aspect of the invention, fiber delay sections are added between the etalons.

In another embodiment of the invention, in a single mode optical fiber in which optical frequency channels are equally spaced, a method for wavelength division multiplexing is provided where a subgroup of the equally spaced frequency channels are selected for transmission and the remainder are reflected wherein the transmittance and reflectance spectra are periodic in frequency, the method including the step of providing an etalon with N equally spaced reflectors. The transmittance and reflectance spectra of said etalon are periodic in optical frequency with a period given by the formula: $(\Delta v)FSR=c/(2ngL)$, where c=the free space speed of light; ng=the group refractive index for the light propagating in the optical fiber medium between the reflectors. A single mode optical fiber is connected to the etalon. The etalon is connected to an output transmission fiber and equally spaced optical frequency channels are transmitted from the optical fiber to the etalon.

In a further aspect of the method, an optical circulator is connected between the single mode optical fiber and the etalon and a reflected output channel is connected to the optical circulator. In another aspect of the method, a tuning device is added to the etalon. In a further aspect, a plurality of etalons are provided and fiber delay sections are included between the etalons.

DESCRIPTION OF THE DRAWINGS

Other objects, features, and advantages of the present invention will become more fully apparent from the following detailed description of the preferred embodiment, the appended claims and the accompanying drawings in which:

DETAILED DESCRIPTION OF THE INVENTION

Figure 1:
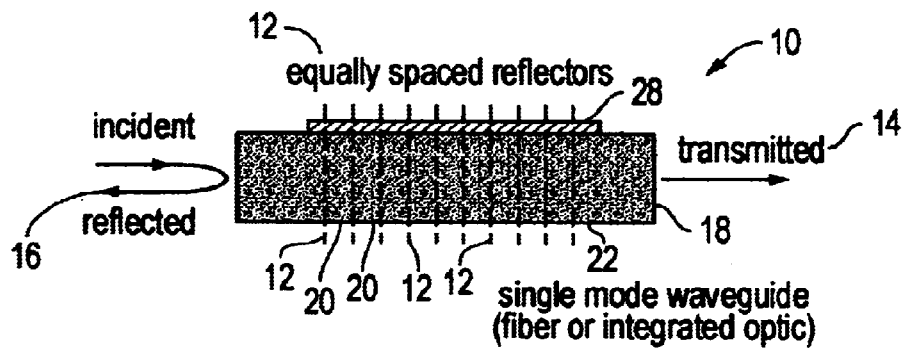
FIG. 1 is a schematic diagram of the multireflector fiberoptic filter apparatus of the present invention in a single mode optical waveguide.

The preferred embodiment of the present invention is illustrated by way of example in FIGS. 1–8. The multireflector fiberoptic filter 10 of the present invention is illustrated in FIG. 1. Reflectances of the individual equally spaced reflectors 12 as well as the separation between them are regarded as design variables which can be chosen to control the spectral dependence of the transmitted light wave 14 and the reflected light wave 16 amplitudes from the etalon 18. A discussion of such design variables is described in the document "Design of Multireflector Resonant Bandpass Filters for Guided Wave Optics." written by applicant and incorporated herein by reference.

Figure 2:
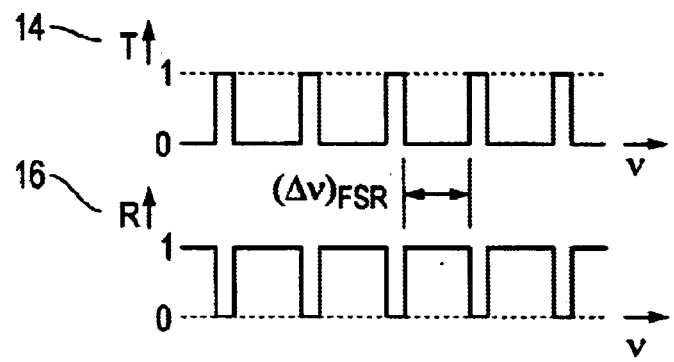
FIG. 2 is a schematic illustrating the ideal transmittance and reflectance spectra for a filter designed for use in wavelength division multiplexing in which optical frequency channels are equally spaced.

Referring now to FIG. 2, the ideal transmittance and reflectance spectra for a filter 10 designed for use in wavelength division multiplexing in which optical frequency channels are equally spaced is illustrated. As illustrated, in operation, the filter 10 of the present invention selects a subgroup of equally spaced frequencies for transmission; the other frequency channels are reflected.

Multireflector etalons 10 as illustrated in FIG. 1 can be implemented by a serial arrangement of single mode fibers 20, each of which has a mirror 12 deposited on one end. Prior to mirror deposition the fibers 20 are mass-polished to a common length L. The mirrors 12 could be multilayer quarter-wave stacks comprising alternating layers of high- and low-index dielectric materials, such as $TiO_2$ and $SiO_2$. Further, the mirrored fibers 20 can be aligned in tubes 22 or in Si V-grooves and joined end-to-end with optical cement or epoxy. Alternatively, the mirrored fiber 20 can be permanently joined together by fusion splicing.

For any etalon 18 with equally spaced reflectors 12, the transmittance and reflectance spectra are periodic in frequency, with the period—known as the free spectral range $(\Delta v)FSR$—given by:

$(\Delta v)FSR=c/(2n_gL)$, with c the free space speed of light=$2.998 \times 10^8$ m/s, $n_g$ the group refractive index of the waveguide mode, and L the separation between reflectors. For example, if the waveguide is a single mode optical fiber 20 with $n_g$=1.46, and L=1 mm, then $(\Delta v)FSR$=102.7 Ghz. Idealized transmittance T and reflectance R spectra for a filter 10 for use in wavelength division multiplexing (WDM) is shown in FIG. 2. The square profiles for the spectra ensure that crosstalk between WDM channels is minimized.

Figure 3:
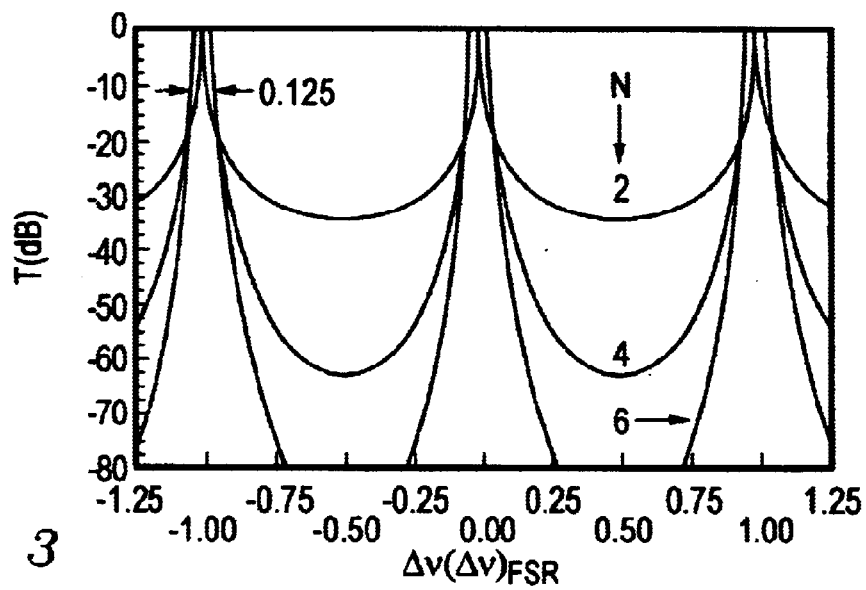
FIG. 3 is a schematic illustrating the calculated transmittance spectra for three cases: N=2, R1=R2=0.962; N=4, R1=R4=0.695, R2=R3=0.984; N=6, R1=R6=0.448, R2=R5=0.941, R3=R4=0.981.

Calculated filter transmittance spectra for N=2, 4, and 6 are shown in FIG. 3. In each case the mirror reflectances are chosen to give alternating spectral regions of high and low transmittance such that the transmittance is <−20 dB (i.e., <1%) over a spectral region of width equal to ⅛ (12.5%) of the free spectral range. (The calculations are further described in the applicant's article "Design of Multireflector Resonant Bandpass Filters for Guided Wave Optics.") The plots of FIG. 3 show that increasing the number of reflectors 12 makes it possible for the spectral characteristics of a multireflector etalon 18 to approach more closely to the ideal characteristics of FIG. 2.

Figure 4:
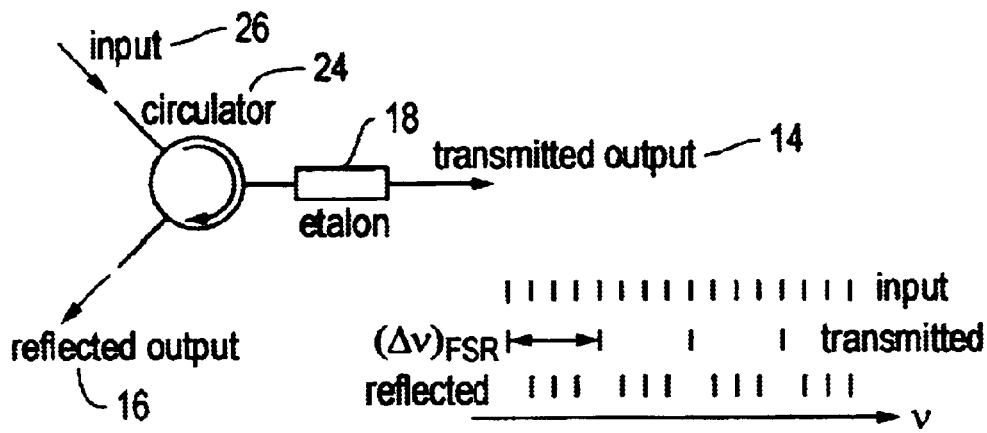
FIG. 4 is a schematic illustrating the use of the multireflector filter apparatus of the present invention in conjunction with an optical circulator to separate equally spaced frequency channels into two groups-one transmitted by the filter and the other reflected.

An optical circulator 24 in series with a multireflector fiber etalon 18 can be used to spatially separate transmitted frequency channels 14 from reflected channels 16, as illustrated in FIG. 4. From the input channel 26, the light incident in one fiber passes through the circulator 24, and one group 14 of equally spaced optical frequency channels is transmitted by the etalon 18. The other frequency channels 16 are reflected by the etalon 18, pass back through the circulator 24, and exit through the third fiber, reflected output 16 . The function performed by the filter 10 of the present invention in this embodiment is sometimes termed "spectral slicing" or "deinterleaving".

Figure 5:
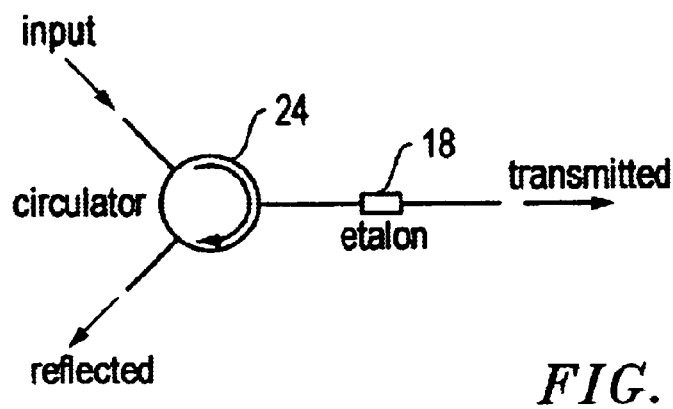
FIG. 5 is a schematic illustrating the configuration of the present invention for simultaneously switching equally spaced frequency channels.
Figure 6:
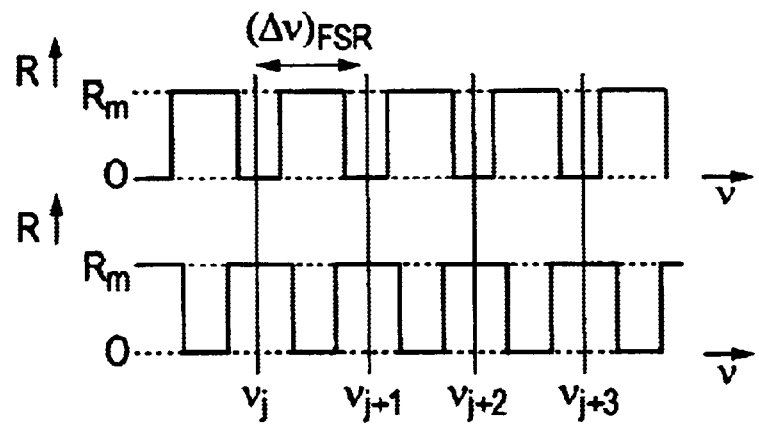
FIG. 6 is a schematic illustration of tuning a multimirror etalon of the present invention to transmit (upper plot) or reflect (lower plot) all of the equally spaced frequencies in a WDM system.

A circulator 24 in series with the multireflector fiber optic filter 10, as in FIG. 5, can also be used for switching all the channels in a WDM system simultaneously, provided that the spacing between the frequency channels {vj} is equal to $(\Delta v)FSR$. Spectral dependence of reflectance for the two states of such a switch 10 are shown in FIG. 6. In one state of the switch 10 (upper plot in FIG. 6), none of the light is reflected at any of the frequencies {vj}. In the other state, (lower plot in FIG. 6) all of the light is reflected in each of the channels. The spectra in FIG. 6 are the same except for a lateral translation in optical frequency of 0.5 $(\Delta v)FSR$. To achieve that frequency translation, it is necessary to produce a π-rad phase shift in Δϕ, the round trip phase shift in the etalon, which is given by $\Delta\phi=4\pi nLv/c$, Thus, tuning by 0.5 $(\Delta v)FSR$ requires that $\Delta(nL)=c/(4v)$ At a wavelength of 1550 nm, then $v=2.998 \times 10^8/1550 \times 10^{-9}=1.93 \times 10^{14}$ Hz, so $\Delta(nL)$=388 nm.

Figure 7:
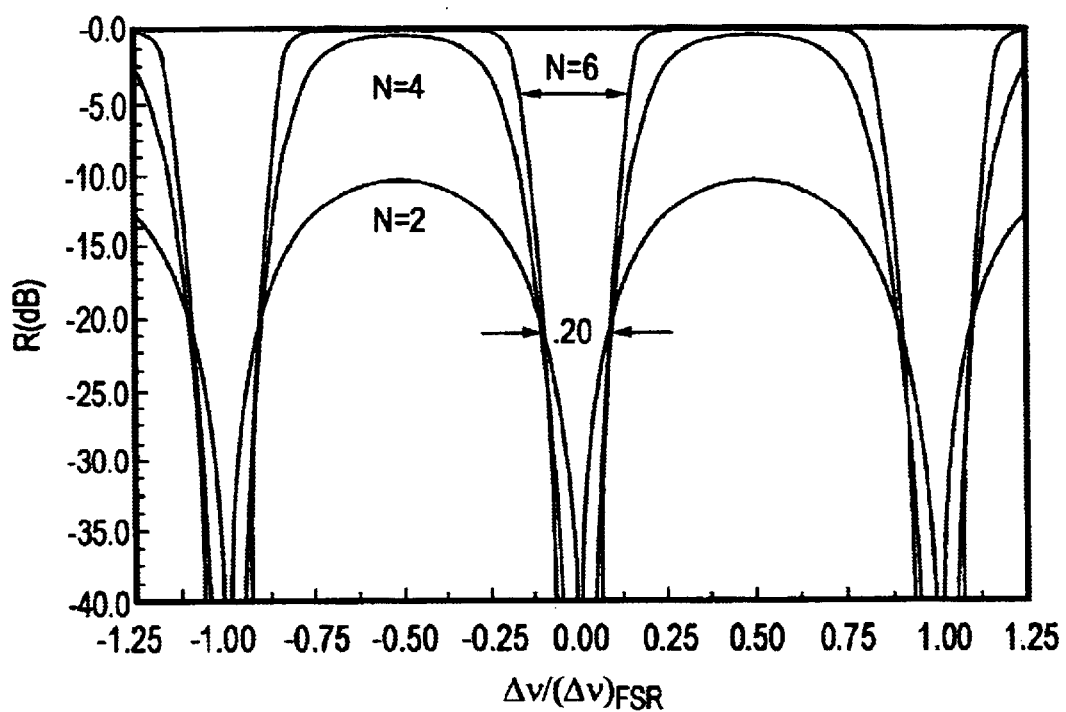
FIG. 7 is a schematic illustration of the calculated plot of reflectance vs. frequency for multireflector etalons for the following three cases: N=2 and mirror reflectances R1=R2= 0.0245; N=4 and mirror reflectances R1=R4=0.0523, R2=R3=0.3418; and N=6 with mirror reflectances R1=R6= 0.039, R2=R5=0.389, and R3=R4=0.689.

The calculated dependence or reflectance on optical frequency is plotted in FIG. 7 for the cases that N=2, 4, and 6.

For each value of N, mirror 12 reflectance values are chosen such that the refletance spectra approach the ideal shape of FIG. 6 as closely as possible. Thus, the cases represented in FIG. 7 correspond to designs for a device 10 for switching equally-spaced wavelength channels. It is important to note that the reflectance spectra approach the ideal spectrum of FIG. 6 more closely as N increases, Again, FIG. 7, shows the calculated plot of reflectance vs. frequency for multireflector etalons 18 of the present invention for the following three cases: N=2 and mirror reflectances R1=R2=0.0245; N=4 and mirror reflectances R1=R4=0.0523, R2=R3=0.3418; and N=6 with mirror reflectances R1=R6=0.039, R2=R5=0.389, and R3=R4=0.689. In each case the mirror reflectances are chosen to give alternating spectral regions of high and low reflectance such that the reflectance is <−20 dB (i.e., <1%) over a spectral region of width equal to 20% of the free spectral range.

Importantly, applicant has determined that the filter 10 of the present invention as described above can be tuned by changing the optical length nL of the etalon 18 sections 20 between adjacent mirrors 12. A change in nL causes a translation in the transmittance and reflectance spectra along the frequency axis. One way of changing nL is to strain (stretch) the fiber 20. The strain can be produced by attaching (bonding) a piezoelectric element 28 along the length of the fiber etalon 18, as shown in FIG. 1, such that an applied voltage causes a length change in the piezoelectric element 28, inducing a longitudinal strain in the fiber sections 20 which comprise the etalon 18. If L=1 mm, as in the preceding example, and n=1.46, then nL=1.46 mm and a strain $\Delta L/L = 388 \times 10^{-9}/1.46 \times 10^{-3} = 265$ μstrain induced in the fiber will produce the π-rad phase shift required for switching.

Figure 8:
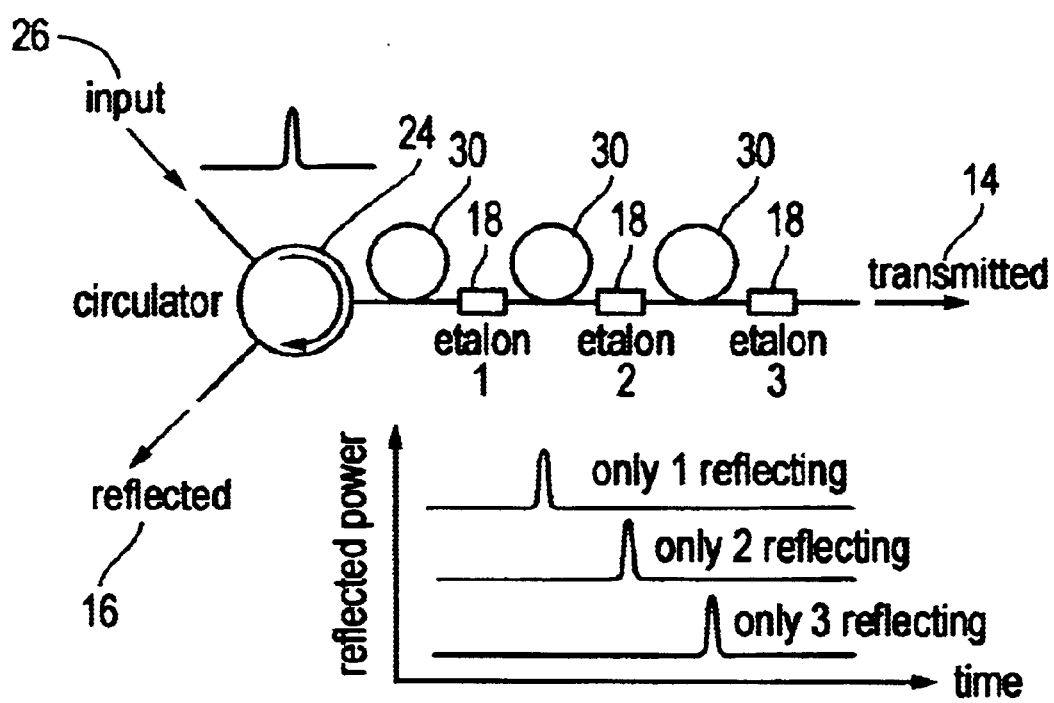
FIG. 8 is a schematic illustration of the present invention utilized to effect a variable delay line for WDM application.

Still further, applicant has determined that a plurality of these etalons 18 arranged in series with fiber delay sections 30 between them can be used to implement a variable delay line, as illustrated in FIG. 8. If one of the etalons 18 is reflecting and the others are transmitting, the reflected optical signal will replicate the incident signal but be delayed. The greater the length of fiber traversed in the fiber delay section 30 before the light is reflected, the greater will be the delay. As indicated earlier, if (Δv)FSR equals the interchannel spacing in a WDM system, each etalon 18 will either transmit or reflect all of the wavelength channels. Thus, except for the effect of fiber dispersion, each of the channels will experience the same delay.

By means of this invention, then, a user is enabled, among other things and for the purposes of illustration only,: (1) to select (deinterleave) a set of equally spaced optical frequency channels from a larger group of optical frequencies propagating in a single mode fiber and (2) to switch light propagating in an optical fiber in a set of equally spaced optical frequency channels from one path to another. Further, a variable delay line for wavelength multiplexed optical signals can be implemented using a multiplicity of the filters of the present invention in a serial arrangement.

The description of the present embodiments of the invention have been presented for purposes of the illustration but are not to be exhaustive or to limit the invention to the form disclosed. Applicant's multireflector filter is extraordinarily well suited for use in fiberoptic communication systems. Obviously, any type of multireflector etalon now known or hereafter developed is encompassed within the scope of the invention. Many modifications and variations will be apparent to those of ordinary skill in the art. As such, while the present invention has been disclosed in connection with the preferred embodiment thereof, it should be understood that there may be other embodiment all within the spirit and scope of the invention as defined by the following claims.

What is claimed is:

1. A multireflector optical filter apparatus wherein the transmittance and reflectance spectra are periodic in frequency, the apparatus comprising an etalon with N equally spaced reflectors wherein the transmittance and reflectance spectra of said etalon are periodic in optical frequency with a period given by the formula: ΔvFSR=c/(2ngL), where c=the free space speed of light; ng=the group refractive index for the light propagating in the medium between the reflectors, L=separation between said reflectors, and N is an integer=3,4,5, . . .

2. The apparatus of claim 1 wherein the etalon is comprised of a serial arrangement of single mode optical fibers of a common length each with a reflector deposited on one end.

3. The apparatus of claim 2 wherein the single mode fibers are aligned in tubes.

4. The apparatus of claim 2 wherein the single mode fibers are aligned in V-grooves formed on a silicon substrate.

5. The apparatus of claim 2 wherein the single mode fibers are interfaced end-to-end with one another by means of one from a group including optical cement, epoxy, fusion splicing, and refractive index matching liquid.

6. The apparatus of claim 1 further comprising:
   a) an optical circulator connected to the etalon; and
   b) a channel connected to the optical circulator for reflected output.

7. The apparatus of claim 6 further comprising a plurality of etalons connected in series.

8. The apparatus of claim 7 further comprising delay sections between said etalons.

9. The apparatus of claim 1 wherein the reflectors are multilayer quarterwave stacks comprising alternating layers of high and low index dielectric materials.

10. The apparatus of claim 9 wherein the dielectric materials are chosen from a group including TiO2 and SiO2.

11. The apparatus of claim 1 further comprising a strain inducing device attached to said etalon.

12. The apparatus of claim 11 wherein said strain inducing device is a piezoelectric element attached along the length of said etalon.

13. The apparatus of claim 1 wherein the reflectors are mirrors.

14. In a fiber optic system with a first input fiber, a second transmitted output fiber and a third reflected output fiber, a multireflector filter apparatus for separating equally spaced frequency channels into two groups- one transmitted and the other reflected wherein the transmittance and reflectance spectra are periodic in frequency, the apparatus comprising:
   a) an etalon with N equally spaced reflectors wherein the transmittance and reflectance spectra of said etalon are periodic in optical frequency with a period given by the formula: ΔvFSR=c/(2ngL), where c=the free space speed of light; ng=the group refractive index for the light propagating in the medium between the reflectors, L=separation between said reflectors, and N is an integer=3,4,5, . . . ;
   b) wherein the etalon is comprised of a serial arrangement of single mode fibers of a common length each with a reflector deposited on one end of said single mode fiber; and
   c) an optical circulator connected to the first input fiber, the etalon and the third reflected output fiber.

15. The apparatus of claim 14 further comprising a plurality of etalons in series.

16. The apparatus of claim 15 further comprising fiber delay sections between said etalons.

17. In a single mode optical fiber in which optical frequency channels are equally spaced, a method for wavelength division multiplexing whereby subgroup of said equally spaced frequency channels are selected for transmission and the remainder are reflected wherein the transmittance and reflectance spectra are periodic in frequency, the method comprising the steps of:

a) providing an etalon with N equally spaced reflectors wherein the transmittance and reflectance spectra of said etalon are periodic in optical frequency with a period given by the formula: $\Delta v FSR=c/(2ngL)$, where c=the free space speed of light; ng=the group refractive index for the light propagating in the medium between the reflectors, L=separation between said reflectors, and N is an integer=3,4,5, . . . ;

b) connecting said single mode optical fiber to said etalon;

c) connecting said etalon to an output transmission fiber; and d) transmitting said equally spaced optical frequency channels from said optical fiber to said etalon.

18. The method of claim 17 further comprising the steps of:

a) connecting an optical circulator between said single mode optical fiber and said etalon; and b) connecting a reflected output channel to said optical circulator.

19. The method of claim 17 further comprising the step of adding a tuning device to said etalon.

20. The method of claim 17 wherein step a) comprises the steps of:

a) adding a plurality of etalons; and b) adding fiber delay section said plurality of etalons.

* * * * *